(12) United States Patent
Kim

(10) Patent No.: US 10,979,374 B2
(45) Date of Patent: Apr. 13, 2021

(54) METHOD, SYSTEM, AND NON-TRANSITORY COMPUTER READABLE RECORD MEDIUM FOR SHARING INFORMATION IN CHATROOM USING APPLICATION ADDED TO PLATFORM IN MESSENGER

(71) Applicant: LINE Plus Corporation, Seongnam-si (KR)

(72) Inventor: Seonkyung Kim, Seongnam-si (KR)

(73) Assignee: LINE PLUS CORPORATION, Seongnam-si (KR)

( * ) Notice: Subject to any disclaimer, the term of this patent is extended or adjusted under 35 U.S.C. 154(b) by 0 days.

(21) Appl. No.: 16/747,706

(22) Filed: Jan. 21, 2020

(65) Prior Publication Data
US 2020/0236074 A1 Jul. 23, 2020

(30) Foreign Application Priority Data
Jan. 21, 2019 (KR) .................. 10-2019-0007468

(51) Int. Cl.
*G06F 3/0482* (2013.01)
*H04L 12/58* (2006.01)
*G06F 16/9035* (2019.01)

(52) U.S. Cl.
CPC .......... *H04L 51/046* (2013.01); *G06F 3/0482* (2013.01); *G06F 16/9035* (2019.01); *H04L 51/02* (2013.01); *H04L 51/10* (2013.01)

(58) Field of Classification Search
CPC .................................................. H04L 51/046
USPC .......................................................... 715/758
See application file for complete search history.

(56) References Cited

U.S. PATENT DOCUMENTS

| | | | | |
|---|---|---|---|---|
| 8,166,411 | B2 * | 4/2012 | Zhang | G06F 3/0488 715/769 |
| 8,694,897 | B2 * | 4/2014 | Kamiyama | G06F 8/34 715/762 |
| 8,726,195 | B2 * | 5/2014 | Bill | G06T 19/006 715/863 |
| 8,977,986 | B2 * | 3/2015 | Herz | G06F 3/04883 715/850 |
| 9,020,110 | B1 * | 4/2015 | Baharav | H04M 15/70 379/93.12 |
| 9,448,705 | B2 * | 9/2016 | Brown | G06F 3/04845 |
| 9,584,991 | B1 * | 2/2017 | Daniel | H04L 51/32 |
| 9,596,319 | B2 * | 3/2017 | Feldman | H04L 65/403 |
| 9,608,944 | B2 * | 3/2017 | Wu | H04L 51/04 |

(Continued)

FOREIGN PATENT DOCUMENTS

KR 2002-0074304 9/2002

*Primary Examiner* — Reza Nabi
(74) *Attorney, Agent, or Firm* — Staas & Halsey LLP

(57) ABSTRACT

Provided is a method, system, and non-transitory computer-readable record medium for sharing information in a chatroom through a platform added to a messenger. An information sharing method includes registering at least one application to a platform of a user of a messenger based on a user input at the messenger installed on the computer system; executing an application selected by the user of the messenger from among applications registered to the platform in a chatroom of the messenger; and transmitting information shared by the application through the chatroom in response to receiving an information share request from the user during an execution of the selected application.

19 Claims, 10 Drawing Sheets

(56) References Cited

U.S. PATENT DOCUMENTS

| | | | |
|---|---|---|---|
| 9,690,456 B2* | 6/2017 | Kang | G06F 3/0481 |
| 10,007,406 B1* | 6/2018 | Libin | G06F 3/0484 |
| 10,313,426 B2* | 6/2019 | Kim | H04L 67/10 |
| 10,846,612 B2* | 11/2020 | Keysers | G06N 20/00 |
| 2004/0041836 A1* | 3/2004 | Zaner | G06Q 10/10 |
| | | | 715/751 |
| 2005/0052685 A1* | 3/2005 | Herf | H04N 1/00217 |
| | | | 358/1.15 |
| 2006/0053040 A1* | 3/2006 | Zurmuehl | G06F 9/451 |
| | | | 715/789 |
| 2010/0061539 A1* | 3/2010 | Cloran | G06Q 30/02 |
| | | | 379/202.01 |
| 2010/0157033 A1* | 6/2010 | Kneissler | G06F 3/0346 |
| | | | 348/61 |
| 2011/0086622 A1* | 4/2011 | Chu | H04M 1/2748 |
| | | | 455/414.1 |
| 2011/0099507 A1* | 4/2011 | Nesladek | G06F 1/329 |
| | | | 715/780 |
| 2012/0086631 A1* | 4/2012 | Osman | A63F 13/5255 |
| | | | 345/156 |
| 2012/0236201 A1* | 9/2012 | Larsen | H04N 21/439 |
| | | | 348/468 |
| 2013/0047146 A1* | 2/2013 | Ugur | G06Q 50/01 |
| | | | 717/172 |
| 2013/0205229 A1* | 8/2013 | Post | H04L 51/04 |
| | | | 715/758 |
| 2013/0217453 A1* | 8/2013 | Briggs | A63F 13/79 |
| | | | 463/7 |
| 2014/0006517 A1* | 1/2014 | Hsiao | A63F 13/795 |
| | | | 709/205 |
| 2014/0223464 A1* | 8/2014 | Moran | H04N 21/44222 |
| | | | 725/12 |
| 2014/0365922 A1* | 12/2014 | Yang | G06Q 50/01 |
| | | | 715/758 |
| 2015/0038178 A1* | 2/2015 | Chin | H04W 4/021 |
| | | | 455/457 |
| 2015/0243127 A1* | 8/2015 | Arnone | G07F 17/326 |
| | | | 463/25 |
| 2015/0356548 A1* | 12/2015 | Luna-Rodriguez | H04W 4/02 |
| | | | 705/39 |
| 2016/0043974 A1* | 2/2016 | Purcell | G06F 3/0482 |
| | | | 715/758 |
| 2016/0210602 A1* | 7/2016 | Siddique | G06Q 30/0601 |
| 2017/0187827 A1* | 6/2017 | Shin | H04L 67/18 |
| 2017/0209786 A1* | 7/2017 | Zhu | A63F 13/211 |
| 2017/0282010 A1* | 10/2017 | Kuiper | A63B 71/0622 |
| 2017/0340147 A1* | 11/2017 | Hambrock | A47G 23/16 |
| 2018/0121828 A1* | 5/2018 | Keysers | G06N 5/04 |
| 2018/0267674 A1* | 9/2018 | Shavit | G06Q 30/0269 |
| 2019/0028588 A1* | 1/2019 | Shinseki | H04M 3/5191 |
| 2019/0220255 A1* | 7/2019 | Taniguchi | G06F 8/34 |
| 2019/0251359 A1* | 8/2019 | Pranger | G06K 9/00302 |
| 2019/0342241 A1* | 11/2019 | Joyce | H04N 21/854 |
| 2020/0036816 A1* | 1/2020 | Babu J D | H04L 67/36 |
| 2020/0057631 A1* | 2/2020 | Taniguchi | G06F 8/33 |
| 2020/0167319 A1* | 5/2020 | Fritz | H04L 9/3239 |

* cited by examiner

METHOD, SYSTEM, AND NON-TRANSITORY COMPUTER READABLE RECORD MEDIUM FOR SHARING INFORMATION IN CHATROOM USING APPLICATION ADDED TO PLATFORM IN MESSENGER

CROSS-REFERENCE TO RELATED APPLICATION(S)

This U.S. non-provisional application claims the benefit of priority under 35 U.S.C. § 119 to Korean Patent Application No. 10-2019-0007468 filed on 2019 Jan. 21, in the Korean Intellectual Property Office (KIPO), the entire contents of which are incorporated herein by reference.

BACKGROUND

Field

One or more example embodiments relate to technology for adding a desired application to a platform in a messenger and sharing information in a chatroom using the added application.

Description of Related Art

An instant messenger that is a general communication tool refers to software capable of sending and receiving messages or data in real time. A user may register a contact on a messenger and may exchange messages with a counterpart included in a contact list in real time.

Such a messenger function is generalized in a mobile environment of a mobile communication terminal as well as a personal computer (PC).

For example, a mobile messenger service system and method of a portable terminal using a wireless communication network to provide a messenger service between mobile messengers installed on portable terminals is disclosed in Korean Laid-Open Publication No. 10-2002-0074304, published on Sep. 30, 2002.

As the use of the instant messenger becomes popular and functions provided through the instant messenger are diversified and improved, an interaction with another service, for example, a game service, a video service, etc., as well as a function of sharing a variety of information and contents, for example, photos, videos, files, contacts, locations, schedules, notifications, votes, etc., are supported.

If a user desires to use another external application during a chat at a messenger, the user may need to inactivate the messenger and then search for and execute a desired application. Also, to return to an original chat, the user may need to inactivate the application in use and then execute again the messenger. Therefore, there are many inconveniences on a user side.

An existing messenger does not provide a user interface (UI) that allows a user to use a desired application in the messenger.

SUMMARY

According to an aspect of at least one example embodiment, there is provided an information sharing method implemented by a computer system including at least one processor configured to execute computer-readable instructions included in a memory, the information sharing method including, by the at least one processor, registering at least one application to a platform of a user of a messenger based on a user input at the messenger installed on the computer system; executing an application selected by the user of the messenger from among applications registered to the platform in a chatroom of the messenger; and transmitting information shared by the application through the chatroom in response to receiving an information share request from the user during an execution of the selected application.

The registering may include providing a user interface including at least one of a list of applications recommended by a server through interaction with the server and a list of applications recommended based on a use history at the computer system.

The registering may include providing a user interface including a list of applications installed on the computer system; and registering, to the platform, an application selected by the user from the list of applications through the user interface.

The registering may include registering an application corresponding to a uniform resource locator (URL) using the URL input from the user.

The registering may include registering, to the platform, an image representing a corresponding application with respect to each of the at least one application.

The registering may include receiving, from a server through interaction with the server, information about a new application registered to the platform by a messenger installed on another computer system used by the user; and providing information about an application install URL or an application related URL when the registered new application is not installed on the computer system.

The executing may include executing the selected application using an in-app browser driving method at the messenger.

The transmitting may include generating a shared image by storing a portion of information being displayed by the application at a point in time at which the information share request is received; and transmitting the shared image through the chatroom.

The transmitting may include, in response to a presence of a URL of information provided from the application, transmit the URL.

The transmitting may include determining whether a URL of information provided from the application is present at a point in time at which the information share request is received, in response to receiving the information share request; transmitting the URL in response to a presence of the URL and generating a shared image by storing a portion of information being displayed by the application at a point in time at which the information share request is received in response to an absence of the URL; and transmitting the shared image through the chatroom.

According to an aspect of at least one example embodiment, there is provided a non-transitory computer-readable record medium storing computer instructions that, when executed by a processor, cause the processor to perform the information sharing method.

According to an aspect of at least one example embodiment, there is provided a computer system including at least one processor configured to execute computer-readable instructions included in a memory. The at least one processor includes a platform manager configured to register at least one application to a platform of a user of a messenger based on a user input at the messenger installed on the computer system; an application executor configured to execute an application selected by the user of the messenger from among applications registered to the platform in a chatroom of the messenger; and an information sharer configured to transmit information shared by the application through the chatroom in response to receiving an information share request from the user during an execution of the selected application.

According to some example embodiments, a user may directly customize an application of an available service at a messenger.

Also, according to some example embodiments, a user may add a desired application to a platform in a messenger using a uniform resource locator (URL).

Also, according to some example embodiments, a user may execute an application added to a messenger and may share information provided from the application as a capture file in a chatroom.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
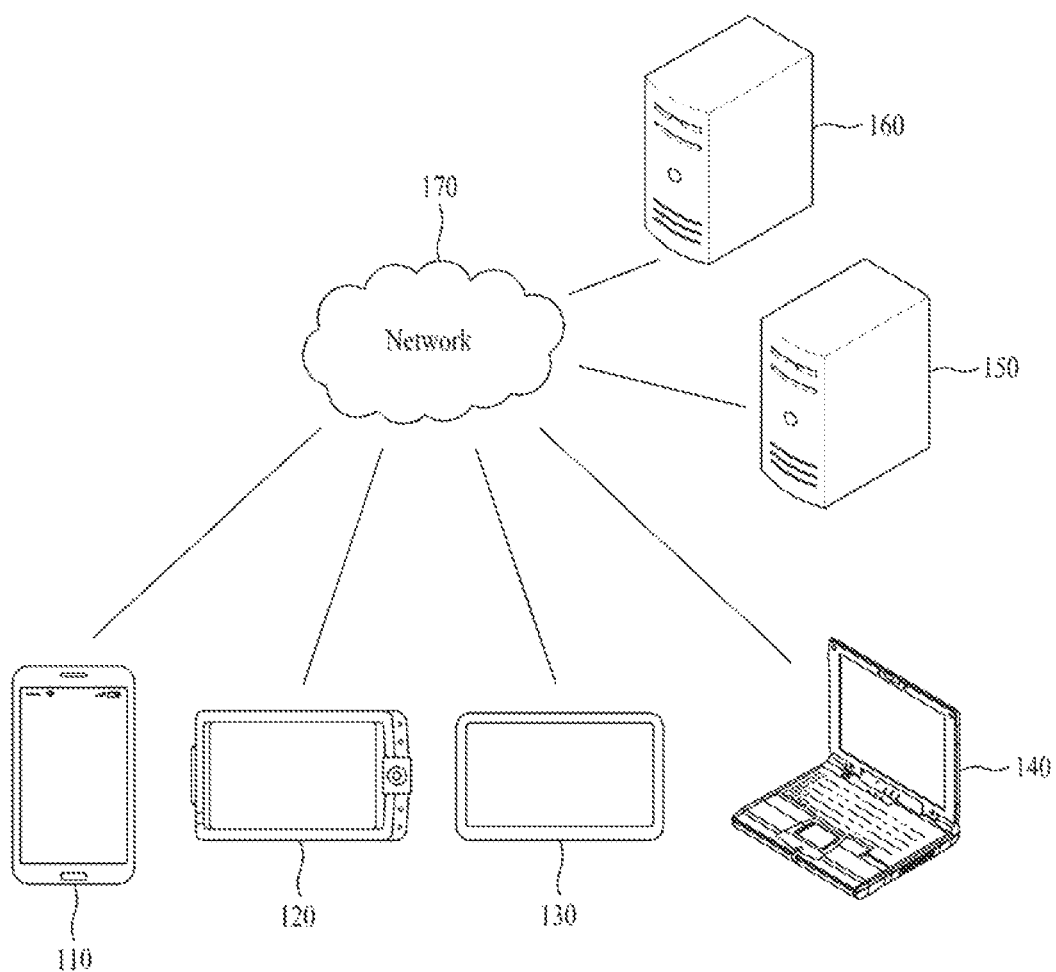
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for sharing information through a chatroom of a messenger.

The example embodiments including the disclosures herein may add an application desired by a user to a platform in a messenger, may share information in a chatroom using the added application, and may achieve many advantages in terms of quality of service (QoS), convenience, efficiency, and cost saving. The platform may refer to a list of applications customized by the user.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service (e.g., a messenger service, etc.) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
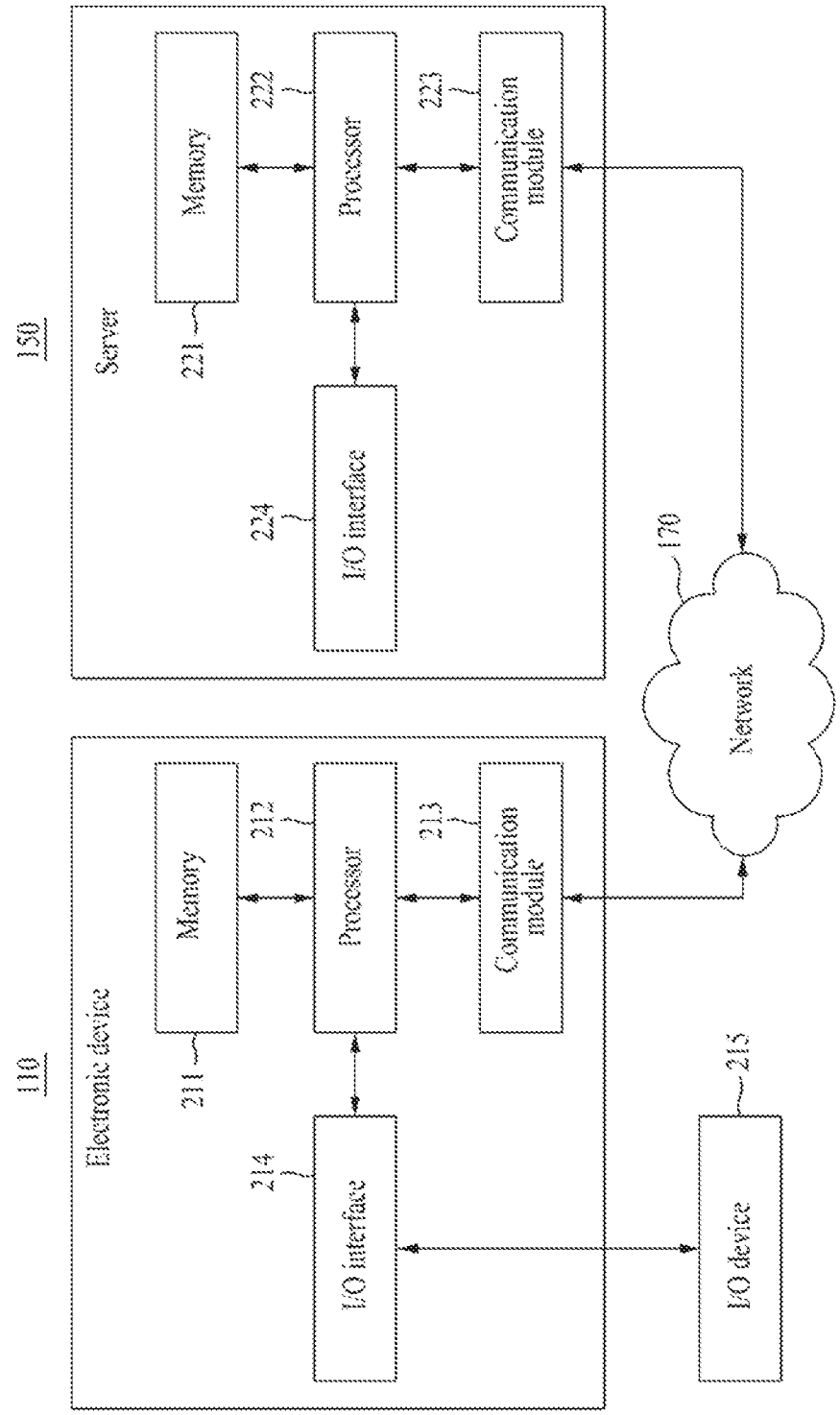
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 with another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 221, content or a service screen configured based on data provided from the server 150 or the electronic device 120 may be displayed on the display through the I/O interface 214.

According to other example embodiments, the electronic device 110 and the server 150 may include a smaller or greater number of components than the number of components shown in FIG. 2. However, there is no need to clearly illustrate many conventional components. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, a method and system for adding an application to a platform in a messenger and sharing information in a chatroom using the added application according to example embodiments is described.

The application used herein may refer to an entity that provides a predetermined service. When an application is added to a platform in a messenger installed and executed on the electronic device 110, access to a service provided from each application may be allowed in a chatroom of the messenger.

The application added to the platform in the messenger may operate in an in-app form on the messenger and may operate in a foreground by setting the messenger as a background.

Figure 3:
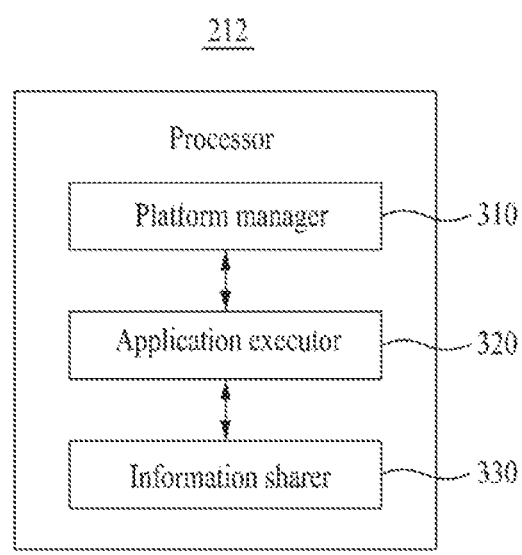
FIG. 3 is a diagram illustrating an example of components includable in a processor of an electronic device according to at least one example embodiment.
Figure 4:
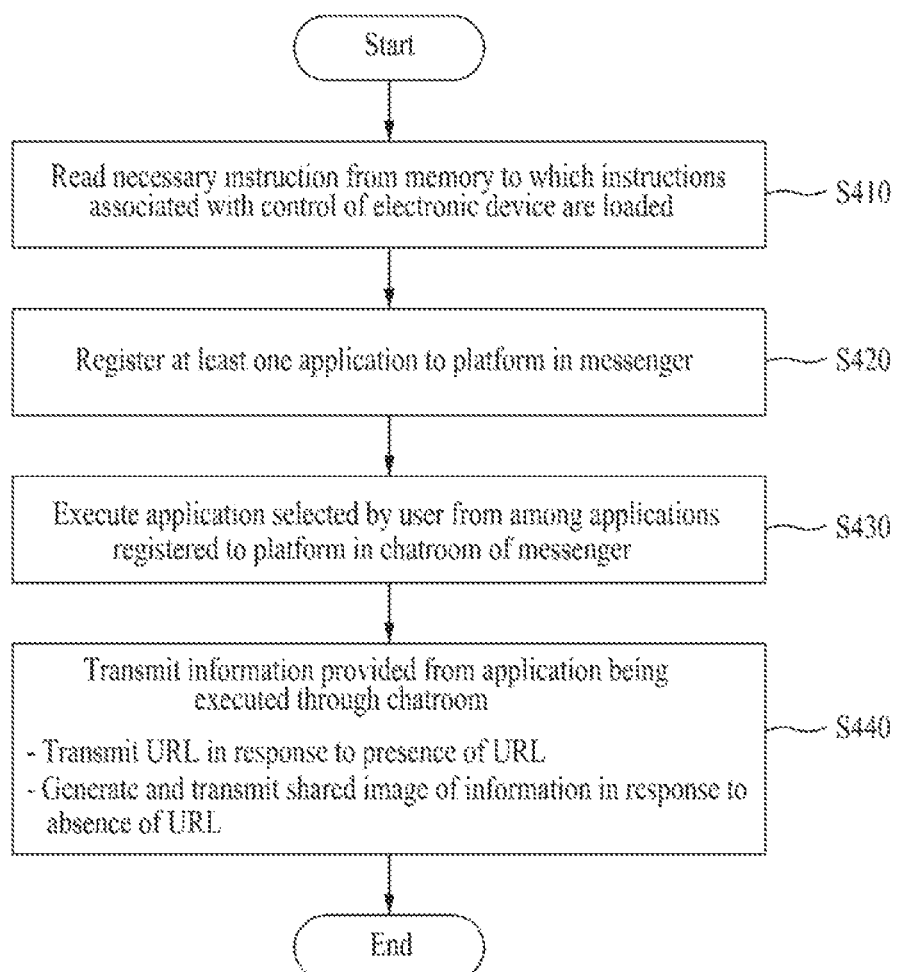
FIG. 4 is a flowchart illustrating an example of a method performed by an electronic device according to at least one example embodiment.

FIG. 3 illustrates an example of components includable in a processor of an electronic device according to at least one example embodiment and FIG. 4 is a flowchart illustrating an example of a method performed by an electronic device according to at least one example embodiment.

In one example embodiment, an information sharing system implemented as a computer may be configured in the electronic device 110. For example, the information sharing system may be configured in a form of an independently operating program or may be configured in an in-app form of a specific application to be operable on the specific application. Depending on cases, the information sharing system may provide a messenger service through interaction with the server 150.

In response to an instruction provided from the application installed on the electronic device 110, the information sharing system configured in the electronic device 110 may perform the information sharing method of FIG. 4.

Referring to FIG. 3, to perform the information sharing method of FIG. 4, the processor 212 of the electronic device 110 may include a platform manager 310, an application executor 320, and an information sharer 330 as components. Depending on example embodiments, the components of the processor 212 may be selectively included in or excluded from the processor 212. Also, depending on example embodiments, the components of the processor 212 may be separated or merged for functional representation of the processor 212.

The processor 212 and the components of the processor 212 may control the electronic device 110 to perform operations S410 to S440 included in the information sharing method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction provided from a program code stored in the electronic device 110, for example, an instruction provided from the application executed on the electronic device 110. For example, the platform manager 310 may be used as a functional representation of the processor 212 to control the electronic device 110 to manage a platform available at the messenger in response to the instruction.

Referring to FIG. 4, in operation S410, the processor 212 may read a necessary instruction from the memory 211 to which instructions associated with control of the electronic device 110 are loaded. In this case, the read instruction may include an instruction for controlling the processor 212 to perform the following operations S420 to S440.

In operation S420, the platform manager 310 may register at least one application to a platform of a user of a messenger based on a user input at the messenger. That is, the platform manager 310 may add an application the user desires to add to the platform of the user of the messenger. For example, the platform manager 310 may provide a user interface that includes a list of applications installed on the electronic device 110 and may register, to the platform in the messenger, an application that is selected by the user from the list of applications through the user interface. As another example, the platform manager 310 may provide a user interface that includes a list of applications recommended by the server 150 through interaction with the server 150 and may register, to the platform in the messenger, an application that is selected by the user from the list of applications through the user interface. Here, the server 150 may recommend an application frequently used for each country based on a popularity or may recommend a list of applications frequently used by other users corresponding to a profile of the user of the electronic device 110. As another example, the platform manager 310 may provide a user interface that includes a list of applications frequently used by the user based on a user history at the electronic device 110 among applications installed on the electronic device 110 and may register, to the platform in the messenger, an application that is selected by the user from the list of applications through the user interface.

The platform manager 310 may provide a list of addable applications in response to an input of an application add request in a chatroom joined by the user of the electronic device 110, for example, my chatroom, or any chatroom among chatrooms of the messenger, an environment setting screen, and the like, and may register an application selected from the list of applications to a platform available on the messenger. Here, if an application the user desires to add is absent in the list of applications, the platform manager 310 may directly input a uniform resource locator (URL) and may add an application corresponding to the input URL. The platform manager 310 may add an application by directly receiving an app install URL or a website URL from the user of the electronic device 110. Alternatively, the platform manager 310 may provide a search function for an application installed or having a use history on the electronic device 110 or an application providable from the server 150 and may add an application specified by the user through a search. The platform manager 310 may realize a personal customization of the user for a platform of an available service on the messenger by adding the application desired by the user to the messenger. For accessibility to a custom platform, the platform manager 310 may include an application added by the user of the electronic device 110 in a menu form included in each chatroom of the messenger.

In operation S430, the application executor 320 may execute a specific application using a multi-driving method with the messenger in response to a selection on the specific application among applications added to the platform in the messenger in the chatroom of the messenger. Since the application added by the user is configured in a menu form, for example, a platform menu, included in the chatroom of the messenger, the application executor 320 may provide a direction route of another service in the chatroom of the messenger. If the user selects the specific application through a menu selection during a chat in the chatroom, the application executor 320 may quickly access a service provided from the specific application according to a multi-driving in the corresponding chatroom. For example, the application executor 320 may execute an application on the messenger using an in-app browser driving method. In response to a selection on an application, the application executor 320 may generate a 2-split screen in which a screen of the electronic device 110 is split into two screens, and may execute each of a messenger and an application on each split screen through an interaction between applications. Further, in response to a selection on at least two applications, the application executor 320 may generate a multi-split screen on which the screen of the electronic device 110 is split into a plurality of screens and may execute each of a messenger and one of the selected at least two applications through an interaction between applications.

In operation S440, the information sharer 330 may transmit information provided from a specific application through a corresponding chatroom and may share information with other users joining the chatroom. In response to receiving an information share request in a state in which the specific application is being executed in the chatroom, the information sharer 330 may store information provided from the application and may share the information as various types of files, for example, a video, an image, a text, a voice, and the like. In detail, in response to receiving an information share request in a state in which the application is being executed in the chatroom, the information sharer 330 may share the corresponding information in an image form by capturing and storing information being currently displayed on the application. The information sharer 330 may generate a file in a predetermined format by storing a portion of information provided from the corresponding application at a point in time at which the information share request is received or during a preset period of time from a point in time at which the information share request is received from the user, and may transmit the generated file to a counterpart that joins the corresponding chatroom through the chatroom. In detail, the information sharer 330 may generate a shared image by storing a portion of information provided from the application at a point in time at which the information share request is received or during a preset period of time from a point in time at which the information share request is received from the user, and may generate the shared image to a counterpart that joins the corresponding chatroom through the chatroom. Here, the preset period of time may be a period determined in advance by the messenger or may be a period determined based on the user input. For example, in a situation in which a file, for example, a shared image, of information provided from an application is shared, the information sharer 330 may transmit the file with a URL of the information in response to a presence of the URL of the information, and may transmit only the file in response to an absence of the URL. As another example, the information sharer 330 may initially determine whether a URL of informatic provided from an application is present in response to receiving an information share request, and may transmit the URL of the information in response to a presence of the URL and may transmit only a shared image in response to an absence of the URL.

Therefore, in an example embodiment, a user may quickly access a service of a corresponding application by adding a frequently using application to a platform menu included in a chatroom of a messenger and by executing the application registered to the platform in the chatroom during a chat.

Figure 5:
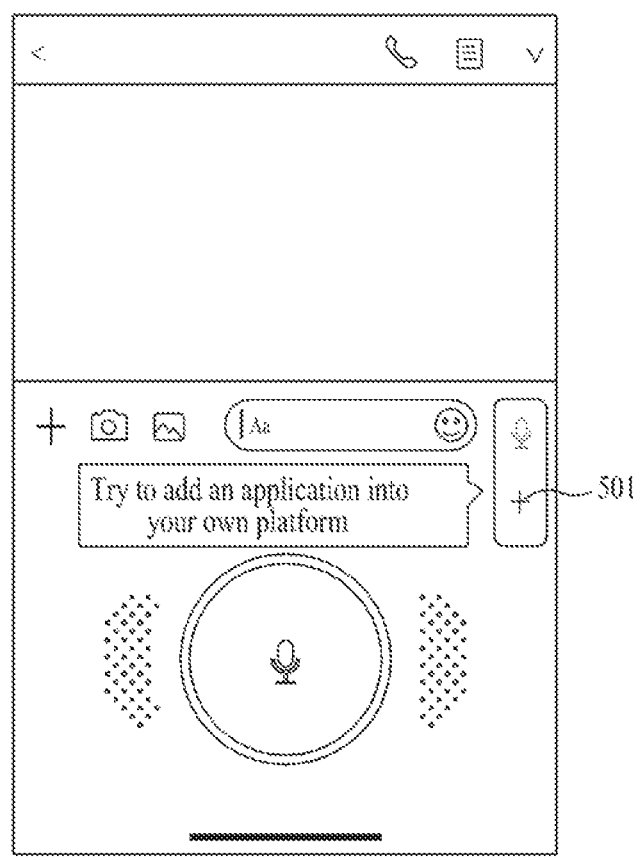
FIGS. 5 to 7 illustrate examples of a screen to describe a process of adding an application according to at least one example embodiment.
Figure 6:
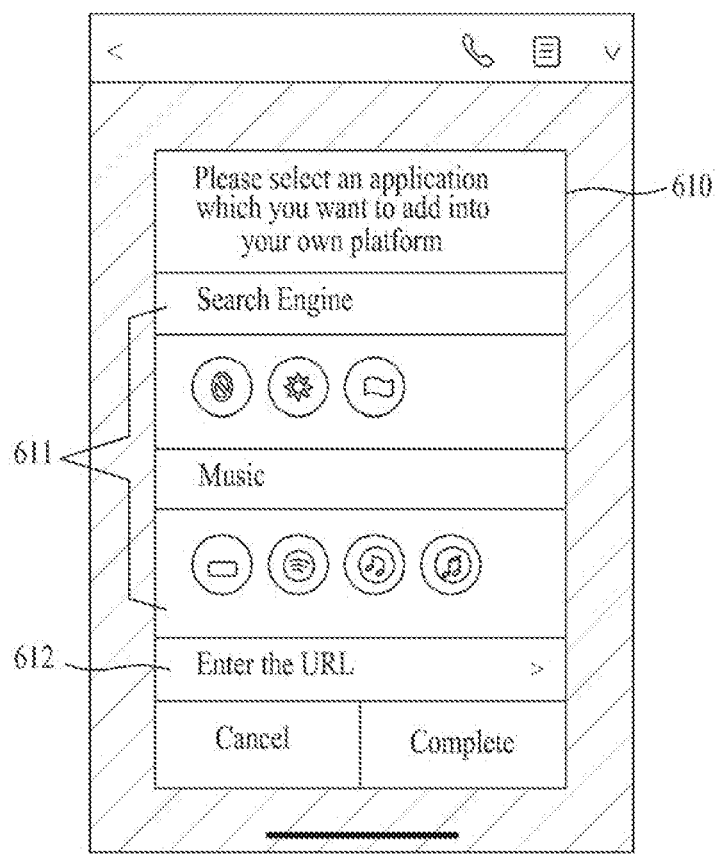
Figure 7:
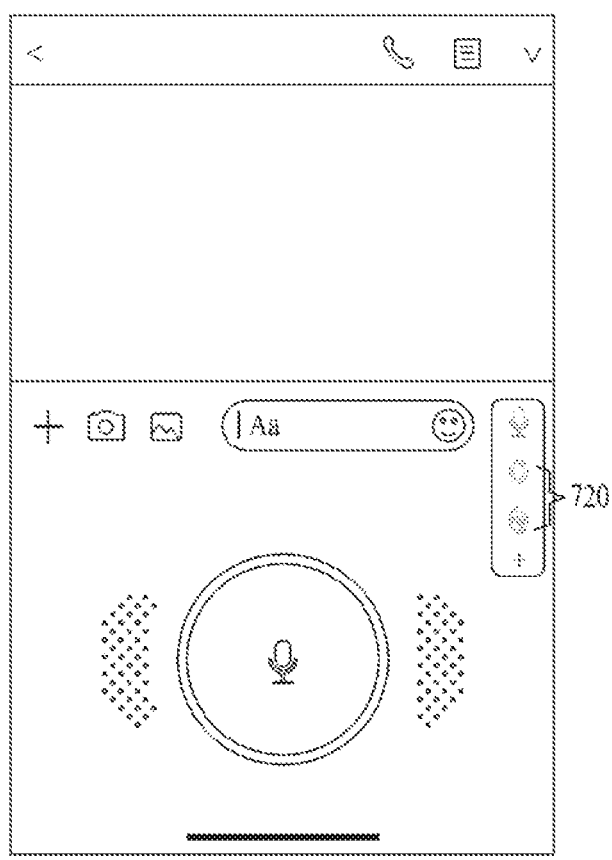

FIGS. 5 to 7 illustrate examples of a screen to describe a process of adding an application according to at least one example embodiment.

FIG. 5 illustrates a chatroom 500 generated at a messenger.

Referring to FIG. 5, an application add user interface (UI) 501 for adding an application to be used at the messenger may be included in the chatroom 500. For example, a menu configuration in the chatroom 500 may include a menu for the application add UI 501 using a region for displaying a UI for a voice message input.

Referring to FIG. 6, in response to a selection on the application add UI 501 in the chatroom 500, an application add screen 610 may be popped up on the chatroom 500. In response to a selection on the application add UI 501 as an application add request, the platform manager 310 may display the application add screen 610 on the chatroom 500.

The application add screen 610 may include a list of applications 611 addable to the messenger, a URL input box 612, and the like. Here, the list of applications 611 may include a list of applications installed on the electronic device 110, a list of applications frequently used at the electronic device 110, a list of applications recommended by the server 150, and the like.

The platform manager 310 may provide the list of applications 611 through the application add screen 610, and may add an application selected by the user from the list of applications 611 to a platform available in the chatroom 500 of the messenger.

If an application the user desires to add is absent in the list of applications 611, the user may add the desired application by directly inputting a URL to the URL input box 612. The platform manager 310 may directly receive an application install URL or an application related URL, for example, a website URL, from the user through the URL input box 612 and may add the same as an application available in the chatroom 500 of the messenger.

In addition to adding an application through a URL input, the platform manager 310 may provide an environment in which the user may add a desired application through a search by providing an application search function through the application add screen 610.

The platform manager 310 may register an image representing a corresponding application with respect to each application added by the user on a platform of the messenger. Here, the platform manager 310 may configure the application added by the user of the electronic device 110 in a menu form included in each chatroom 500 of the messenger. Referring to FIG. 7, the platform manager 310 may configure and display a platform menu 720 representing the added application as a menu in the chatroom 500. Each menu button may include an icon image of a web or an app corresponding to the application.

The platform menu 720 may be commonly displayed in all of the chatrooms of the messenger. Depending on example embodiments, a different platform menu may be configured and displayed for each chatroom by adding an application for each chatroom.

Figure 8:
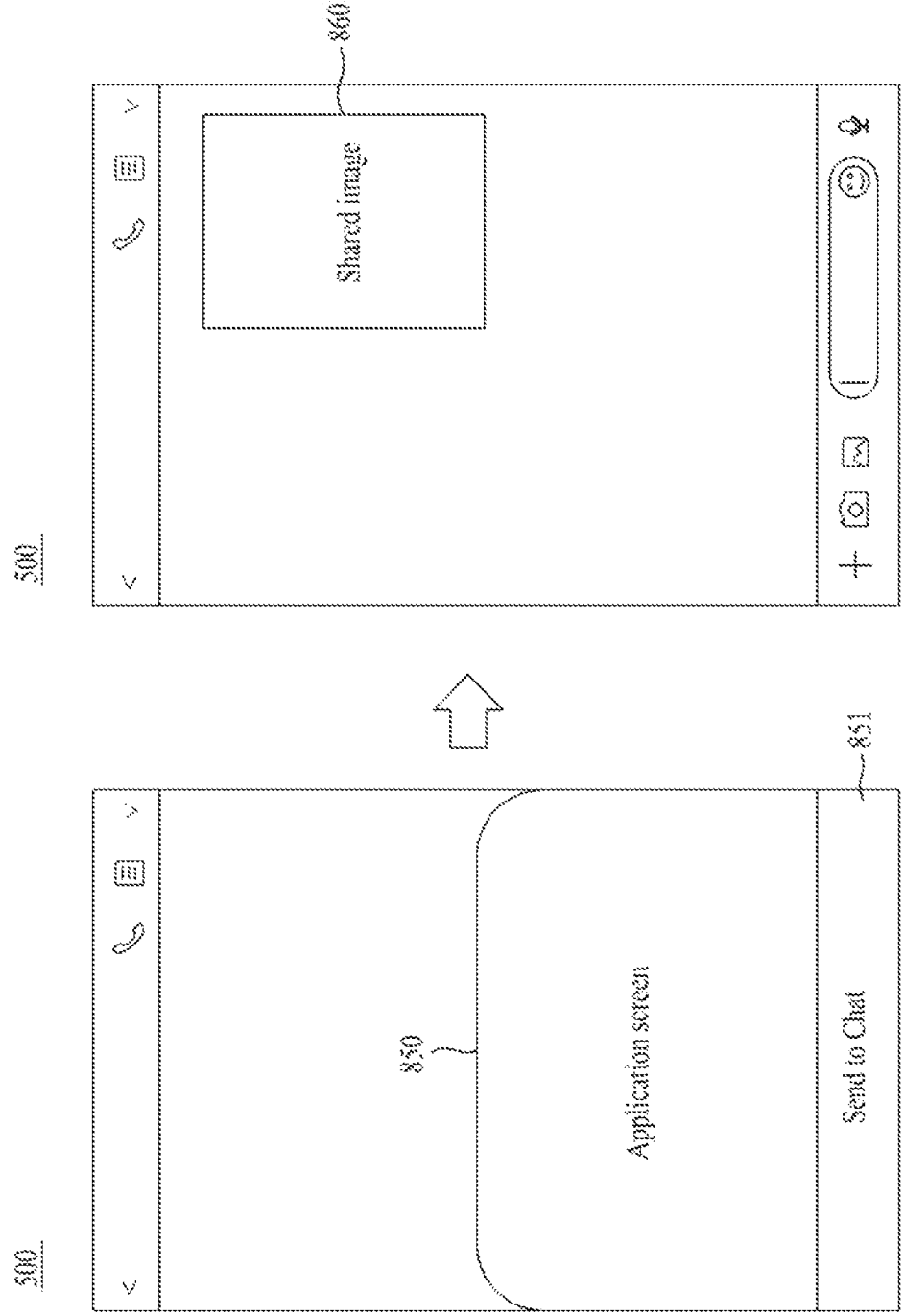
FIG. 8 illustrates an example of a screen to describe a process of sharing information using an application added to a platform in a messenger according to at least one example embodiment.

FIG. 8 illustrates an example of a screen to describe a process of sharing information using an application added to a platform in a messenger according to at least one example embodiment.

Referring to FIG. 8, in response to a selection on a specific application through the platform menu 720 in the chatroom 500 of FIG. 7, the specific application may be executed in the chatroom 500 and an application screen 850 through which a service of the specific application is available may be provided. The user may add a frequently using application to a platform to be immediately accessible in the chatroom 500. Therefore, if the user desires to search for information or desires to share information during a chat in the chatroom 500, the user may quickly access the service.

An application added to a custom platform may be executed in the chatroom 500 of the messenger through interaction with the messenger. Here, a send button 851 for transmitting information provided from the application to the chatroom 500 may be included in the application screen 850.

The user may use a desired service through the application screen 850 executed in the chatroom 500. If the user desires to share information with a counterpart the user having a conversation with while using the service, the user may push, that is, input the send button 851. Here, the user may generate a shared image 860 by storing a portion of information displayed by the application at an input point in time of the send button 851 and may share the shared image 860 with the counterpart joining the chatroom 500 by transmitting the shared image 860 through the chatroom 500.

Here, at a time of transmitting the shared image 860 of information provided from the application, a URL of the information may be present. In this case, the shared image 860 may be transmitted with the URL. Depending on example embodiments, in response to an input of the send button 851, whether the URL of information provided from the application is present may be determined and the URL of the information may be transmitted in response to a presence of the URL and the shared image 860 may be transmitted in response to an absence of the URL.

Figure 9:
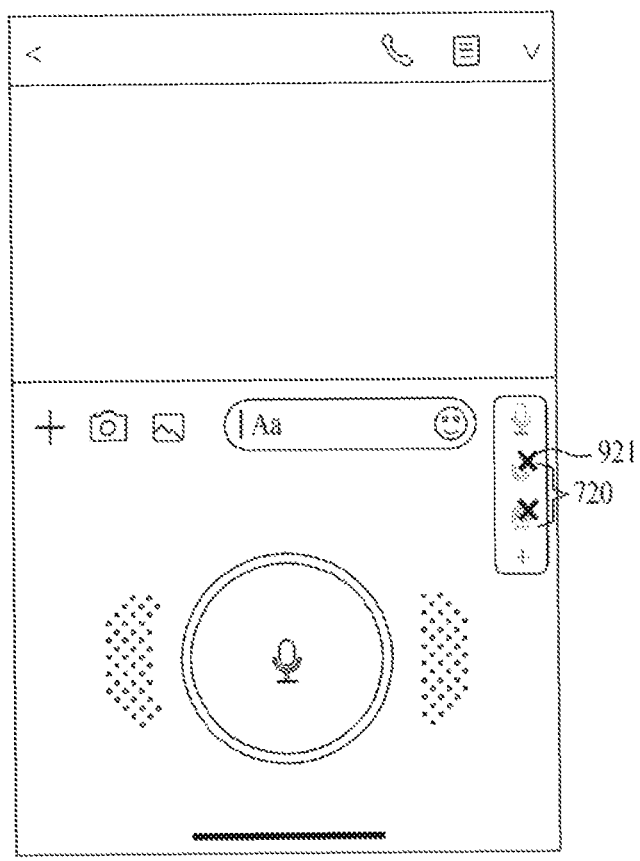
FIG. 9 illustrates an example of a screen to describe a process of managing an application added to a platform in a messenger according to at least one example embodiment.

FIG. 9 illustrates an example of a screen to describe a process of managing an application added to a platform in a messenger according to at least one example embodiment.

The platform manager 310 may provide an edit function of deleting an added application from a messenger or changing a position of an icon.

Referring to FIG. 9, in response to a selection on an icon from a platform menu 720 representing an application added to a platform in the messenger, for example, in response to a long tap of the platform menu 720, a cancel button 921 may be activated for each menu. Here, the application added to the messenger may be selectively deleted using the cancel button 921.

If at least one application is added to the messenger, the platform menu 720 may be displayed on a region on which a UI for a voice message input is present may be displayed in the chatroom 500. Here, if no application is added to the messenger or if all of the applications are deleted from the messenger, a voice message input UI may be automatically set and displayed as a default icon at a corresponding position.

In a state in which the cancel button 921 is activated, an application added to the messenger may be deleted and a position of the icon included in the platform menu 720 may be changed. For example, if at least two applications are added to the messenger, a position of an icon representing a specific application may be changed in the platform menu 720 through a long tap.

Further, the platform manager 310 may synchronize a custom platform on a messenger installed on the electronic device 110 with a messenger installed on another electronic device, for example, the electronic device 120, used by the user of the electronic device 110 through interaction with the server 150, and may support the user to use the same custom platform as that of the electronic device 110 even through the messenger of the other electronic device. The platform manager 310 may receive information about a new application registered to the platform by the messenger installed on the electronic device 120, from the server 150 through interaction with the server 150. When the registered new application is not installed on the electronic device 110, the platform manager 310 may provide information about an application install URL or an application related URL. Here, information about the registered new application may be periodically received from the server 150 and, when the messenger installed on the electronic device 110 is being executed, may be received immediately after the application is registered to the electronic device 120 or when the messenger is in a foreground.

Figure 10:
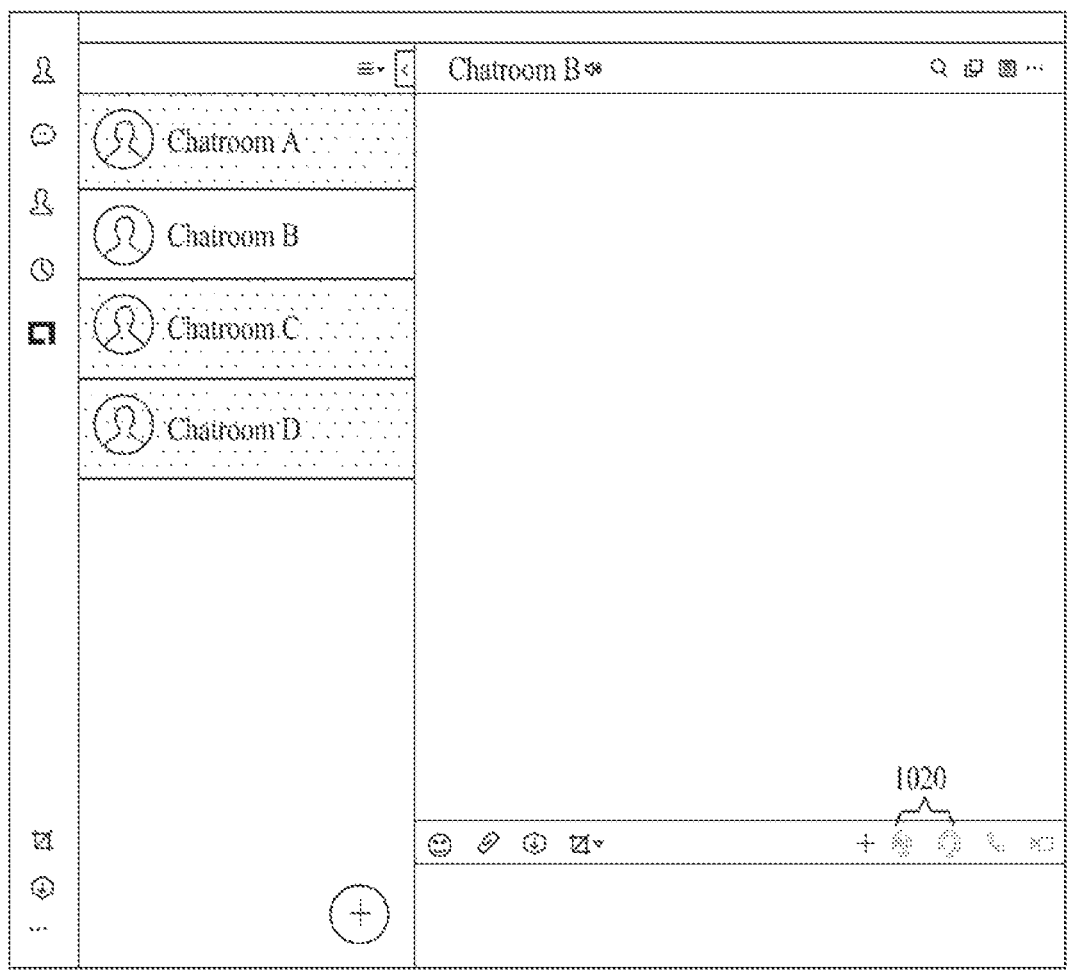
FIG. 10 illustrates an example of a screen to describe a process of synchronizing an application added to a platform in a messenger between electronic devices used by the same user according to at least one example embodiment.

FIG. 10 illustrates an example of a PC version screen of a messenger used by the same user of the electronic device 110.

It is assumed that the electronic device 110 and the electronic device 120 are terminals used by the same user, a mobile version messenger is installed on the electronic device 110 and a PC version messenger is installed on the electronic device 120.

FIG. 10 illustrates a chatroom 1000 of a PC version messenger.

The electronic device 120 may download information about an application added to the messenger of the electronic device 110 through the server 150 and may configure and display a list of custom platforms 1020 identical to that of the electronic device 110 as a menu included in the chatroom 1000 of the messenger. That is, through synchronization between the PC version messenger and the mobile version messenger, it is possible to automatically add a custom platform installed on the mobile version messenger to the PC version messenger and to allow the user to use a corresponding platform in the chatroom 1000 of the PC version messenger.

The list of custom platforms 1020 of the electronic device 120 may include an icon of an app installed on the electronic device 120, an icon included in a website URL, an icon provided from an app store, an icon downloaded from the server 150, and the like. If an application added to the messenger of the electronic device 110 is not installed on the electronic device 120, an application install URL or a website URL that maps the application may be displayed on the list of custom platforms 1020. To this end, the server 150 may generate an application mapping database by collecting a website URL that maps a corresponding application for each application and may provide a related URL with respect to an application that is not installed on the electronic device 120. Here, if a plurality of website URLs is present for a single application, the server 150 may designate a URL most frequently used by users or a URL verified by users as a representative URL and may apply the same to the application mapping database.

According to some example embodiments, a user may directly customize an application of a service available at a messenger and may add a desired application using a URL in configuring a custom platform. Further, according to some example embodiments, it is possible to execute an application included in a custom platform in a chatroom of a messenger and to generate a portion of information provided from the corresponding application into a file in a predetermined (or, alternatively, desired) format at a point in time at which an information share request is received from the user or during a preset period of time from a point in time at which the information share request is received from the user and to share the generated file through the messenger. For example, it is possible to generate an image file by executing an application included in the custom platform in the chatroom of the messenger and by capturing information provided from the application, and to share the generated image file through the messenger. By sharing information in a file form regardless of a presence/absence of a URL of information to be shared through the chatroom of the messenger, it is possible to share various types of information, such as a voice, as well as a video or an image and to share even information not having a URL, which differs from an information sharing method using the URL.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method implemented by a computer system comprising at least one processor configured to execute computer-readable instructions stored in a memory, the method comprising:

by the at least one processor, registering at least one application to a platform of a messenger installed on the computer system, based on a user input to the messenger by a user of the messenger;

executing, while in a chatroom of the messenger, an application selected by the user from among the at least one application registered to the platform, using an in-app browser driving method by generating a 2-split screen; and transmitting, to the chatroom, information provided by the executed application to thereby share the information in the chatroom, in response to receiving a request to share the information in the chatroom from the user during execution of the application.

2. The method of claim 1, wherein the registering comprises:

providing a user interface including at least one of a list of applications recommended by a server through interaction with the server and a list of applications recommended based on a use history of the user, wherein each application in the list of application recommended by the server through interaction with the server and each application in the list of applications recommended based on the use history of the user is selectable by the user input to register the selected application to the platform by the registering.

3. The method of claim 1, wherein the registering comprises:

providing a user interface comprising a list of applications installed on the computer system, wherein each application in the list of applications is selectable by the user input to register the selected application to the platform by the registering.

4. The method of claim 1, wherein the user input includes a uniform resource locator (URL) input by the user, and the at least one application registered by the registering includes an application corresponding to the URL.

5. The method of claim 1, wherein the registering comprises:

for each application of the at least one application, registering, to the platform, an image representing the application.

6. The method of claim 1, wherein the registering comprises:

receiving, from a server through interaction with the server, information about a new application registered to a platform of a messenger installed on another computer system used by the user; and providing information about an application install URL for the new application or an application related URL for the new application when the new application is not registered in the platform of the messenger installed on the computer system.

7. The method of claim 1, wherein the transmitting comprises:

generating a shared image by storing a portion of the information while the information is being displayed by the executed application at a point in time at which the request is received; and transmitting the shared image to the chatroom to thereby share the shared image in the chatroom.

8. The method of claim 1, wherein the transmitting comprises, in response to a presence of a URL of the information provided by the executed application, transmitting the URL to the chatroom to thereby share the URL in the chatroom.

9. The method of claim 1, wherein the transmitting comprises:

determining whether a URL of the information provided by the application is present at a point in time at which the request is received;

in response to determining that the URL is present, transmitting the URL to the chatroom to thereby share the URL in the chatroom; and, in response to determining that the URL is not present, generating a shared image by storing a portion of the information while the information being displayed by the application at the point in time at which the request is received, and transmitting the shared image to the chatroom to thereby share the shared image in the chatroom.

10. A non-transitory computer-readable record medium storing computer instructions that, when executed by a processor, cause the processor to perform the method of claim 1.

11. A computer system comprising:

a memory storing computer-readable instructions; and at least one processor configured to execute the computer-readable instructions to perform a process comprising:

registering at least one application to a platform of a messenger installed on the computer system, based on a user input to the messenger by a user of the messenger;

executing, while in a chatroom of the messenger, an application selected by the user from among the at least one application registered to the platform, using an in-app browser driving method by generating a 2-split screen; and transmitting, to the chatroom, information provided by the executed application to thereby share the information in the chatroom, in response to receiving a request to share the information in the chatroom from the user during execution of the application.

12. The computer system of claim 11, wherein the registering comprises:

providing a user interface including at least one of a list of applications recommended by a server through interaction with the server and a list of applications recommended based on a use history of the user, wherein each application in the list of application recommended by the server through interaction with the server and each application in the list of applications recommended based on the use history of the user is selectable by the user input to register the selected application to the platform by the registering.

13. The computer system of claim 11, wherein the use input includes a uniform resource locator (URL) input by the user, and the at least one application registered by the registering includes an application corresponding to the URL.

14. The computer system of claim 11, wherein the registering comprises:

for each application of the at least one application, registering, to the platform, an image representing the application.

15. The computer system of claim 11, wherein the registering comprises:
   receiving, from a server through interaction with the server, information about a new application registered to a platform of a messenger installed on another computer system used by the user, and
   providing information about an application install URL for the new application or an application related URL for the new application when the new application is not registered in the platform of the messenger installed on the computer system.

16. The computer system of claim 11, wherein the executing comprises:
   executing the application selected by the user using an in-app browser driving method while in messenger.

17. The computer system of claim 11, wherein the transmitting comprises:
   generating a shared image by storing a portion of the information while the information is being displayed by the executed application at a point in time at which the request is received, and
   transmitting the shared image to the chatroom to thereby share the shared image in the chatroom.

18. The computer system of claim 11, wherein the transmitting comprises:
   in response to a presence of a URL of the information provided by the executed application, transmitting the URL to the chatroom to thereby share the URL in the chatroom.

19. The computer system of claim 11, wherein the transmitting comprises:
   determining whether a URL of the information provided by the application is present at a point in time at which the request is received,
   in response to determining that the URL is present, transmitting the URL to the chatroom to thereby share the URL in the chatroom, and,
   in response to determining that the URL is not present, generating a shared image by storing a portion of the information while the information is being displayed by the application at the point in time at which the request is received, and transmitting the shared image to the chatroom to thereby share the shared image in the chatroom.

* * * * *